United States Patent [19]
Holther, Jr.

[11] 3,894,254
[45] July 8, 1975

[54] ELECTRIC MOTOR POWER UNIT

[75] Inventor: Grover P. Holther, Jr., Mt. Prospect, Ill.

[73] Assignee: Racine Federated, Inc., Racine, Wis.

[22] Filed: Mar. 4, 1974

[21] Appl. No.: 447,504

[52] U.S. Cl. .................. 310/66; 310/50; 310/91
[51] Int. Cl. ............................................. H02k 7/00
[58] Field of Search ............ 310/47, 50, 51, 52, 66, 310/81, 91, 89, 68 A, 239, 241, 242, 244; 174/50, 50.52; 248/15; 259/1; 320/2

[56] References Cited
UNITED STATES PATENTS

| | | | |
|---|---|---|---|
| 2,728,000 | 12/1955 | Marchand | 310/66 |
| 2,774,925 | 12/1958 | Wagner | 310/241 |
| 3,308,317 | 3/1967 | Allenbaugh | 310/89 |
| 3,333,825 | 8/1967 | Wolter | 259/1 |
| 3,462,623 | 8/1969 | Batson | 310/89 |
| 3,480,813 | 11/1969 | Sillano | 310/241 |
| 3,544,820 | 1/1969 | Wightman | 310/52 |
| 3,579,007 | 5/1971 | Walter | 310/242 |
| 3,770,331 | 11/1973 | Sellers | 310/50 |

Primary Examiner—R. Skudy
Attorney, Agent, or Firm—Wegner, Stellman, McCord, Wiles & Wood

[57] ABSTRACT

An electric motor power unit having a casing mounting a motor. A handle support encircles the casing and is formed of resilient, electrically non-conducting material. A series of elongate frame members extend through the handle support to locations beyond opposite ends of the casing and at one end mount a quadrilateral handle. The handle facilitates engagement of the unit by a hand of an operator, with an operating switch for the motor positioned for easy manipulation by an operator. The brushes for the motor are located within a removable end cap to avoid exposure and the end cap is removable for access to the brush holders and with the brush holders having pivotally mounted brush retainers permitting easy replacement of brushes.

10 Claims, 7 Drawing Figures

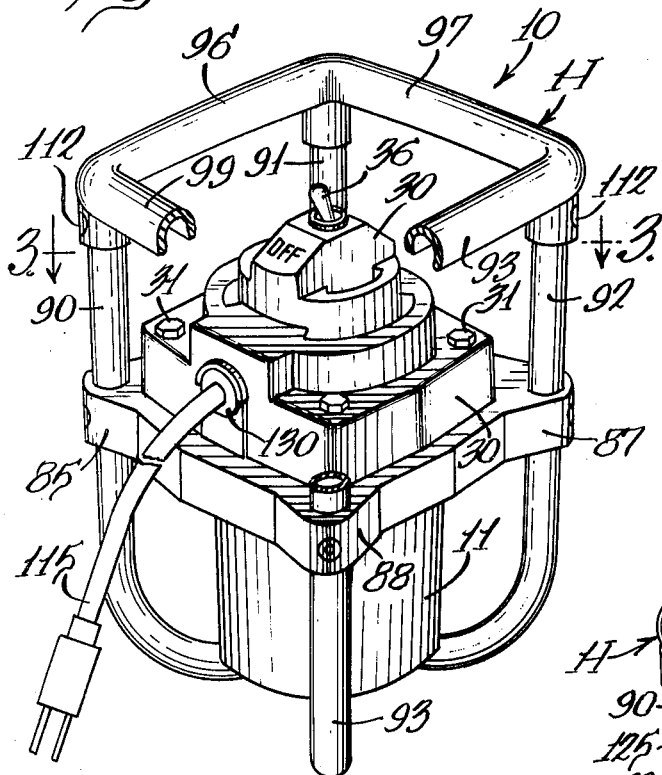
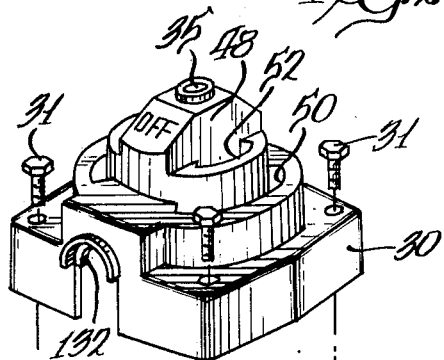
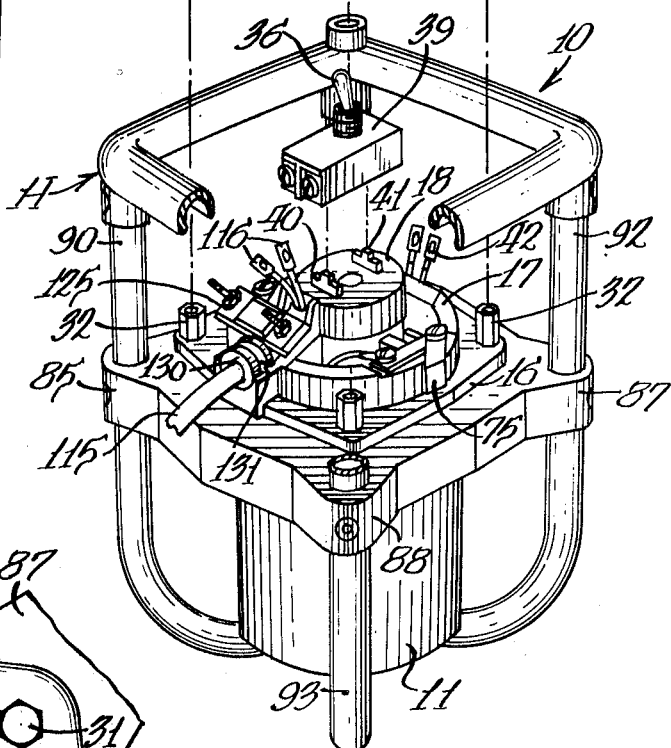
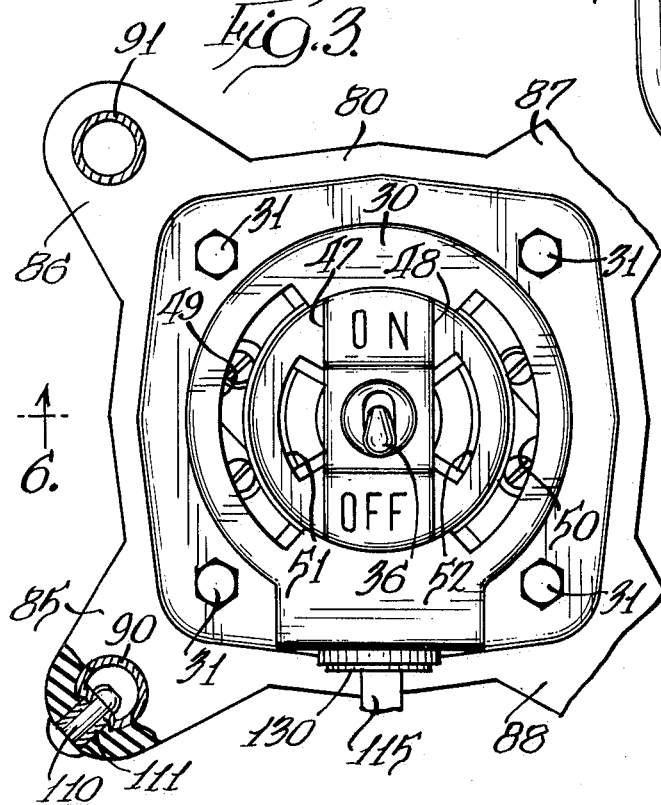
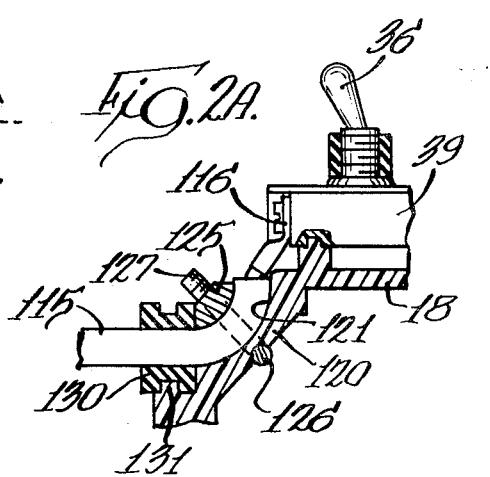

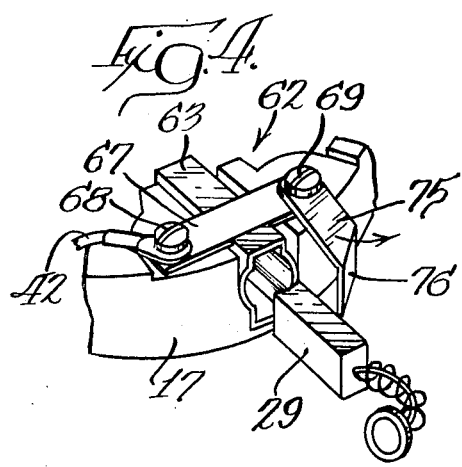
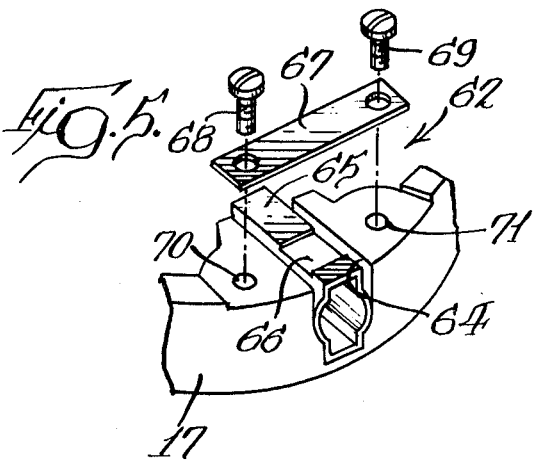
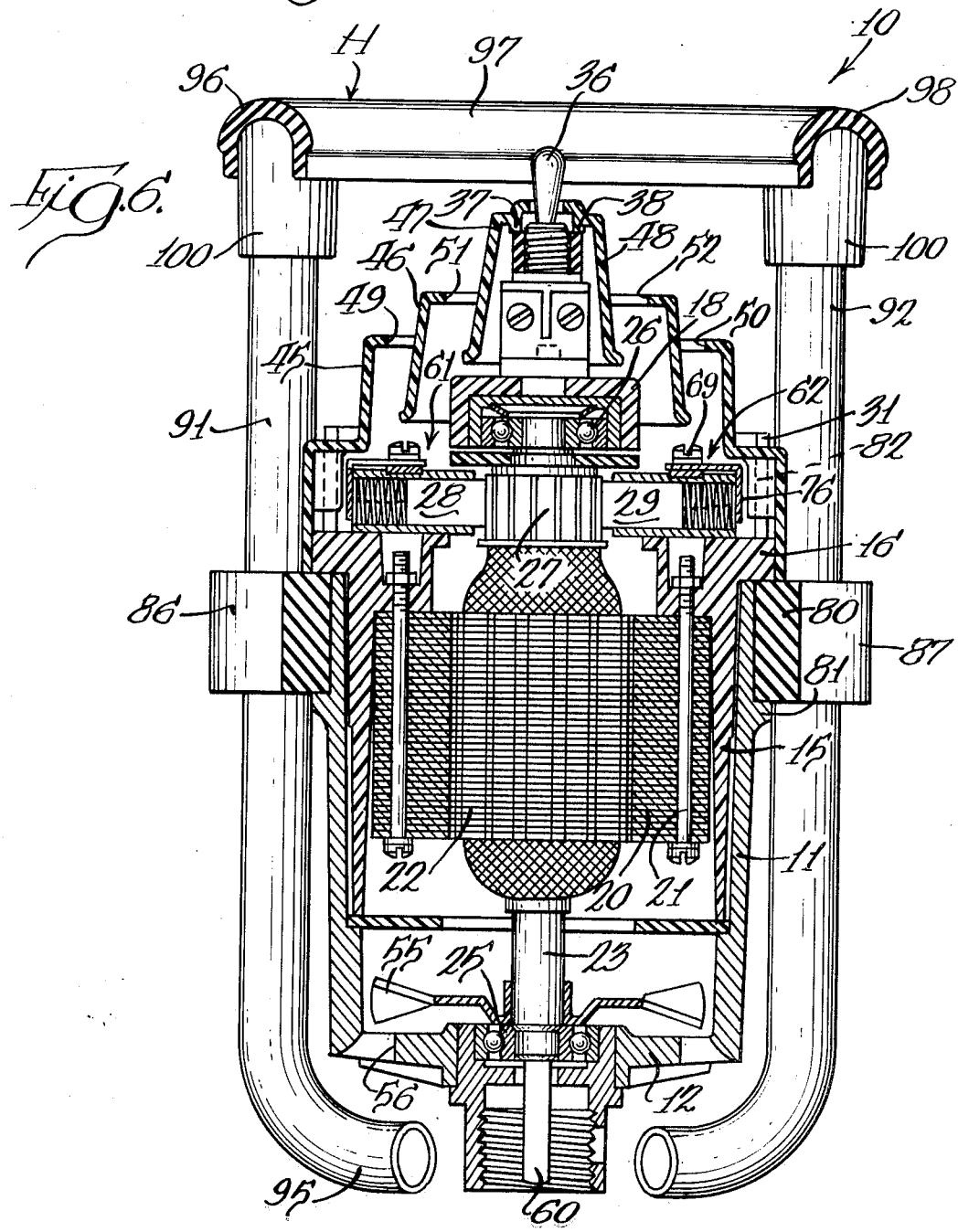

3,894,254

ELECTRIC MOTOR POWER UNIT

BACKGROUND OF THE INVENTION

This invention pertains to an electric motor power unit for driving a tool, such as a concrete vibrator, and, more particularly, the handle structure facilitating handling of the unit as well as improved brush holder structure for the motor and with structure easily adjusted for replacement of brushes and with this structure protected against exposure to concrete.

A company related to the assignee of this application has marketed an electric power unit for driving a concrete vibrator for several years. This unit is shown in U.S. Pat. Nos. 3,042,386 and 3,180,625. The prior unit has had a series of elongate tubular members extending lengthwise of a casing with inturned ends crossing and connecting at one end to form a handle structure and with elongate frame members secured to a pair of straps spaced longitudinally of the casing and which are bolted to the casing. Additionally, the prior unit has had removable fittings exposed to the exterior of the casing for replacement of motor brushes, with such fittings being exposed to concrete in use of the unit and becoming difficult to remove. The prior handle structure has not been of an electrically insulated structure, has not been resilient, and has not provided a structure at the end of the unit providing for easy manual engagement of the unit with an operating switch for the motor positioned for operation while the handle at an end of the casing is engaged.

SUMMARY

A primary advantage of the invention disclosed herein is in providing an insulating and resilient handle structure for an electric motor power unit wherein a handle support encircles a casing mounting a motor intermediate the ends of the casing, with the handle support being formed of resilient electrically non-conducting material and mounting a series of elongate frame members extending beyond opposite ends of the casing and the frame members at one end thereof mounting a quadrilateral handle, with each side of the handle being of a length to permit engagement thereof by a hand of an operator and with an operating switch for the motor positioned for manual operation while the unit is being held by an operator.

Another advantage of the invention disclosed herein resides in the use of a removable end cap at one end of the casing which functions to hold the operating switch for the motor in position and which encloses the brush holders for the motor to prevent contact with cement and which may be removed for access to the brush holders. The end cap also has air passages for flow of air into the casing.

An additional feature of the invention is an improved structure of the brush holder and brush retaining structure wherein a brush holder may be positively aligned in proper position with respect to the commutator of the motor and with the structure for holding the brush holder in position also including a mounting for a pivotally mounted brush retainer which may be pivoted between a brush-holding position and a position permitting replacement of a brush.

BRIEF DESCRIPTION OF THE DRAWING

FIG. 1 is a perspective elevational view of the electric motor power unit with a part of the handle broken away;

FIG. 2 is an exploded view of the parts shown in FIG. 1;

FIG. 2A is a fragmentary section, on an enlarged scale, taken generally along the line 2A—2A in FIG. 2;

FIG. 3 is a plan section, taken generally along the line 3—3 in FIG. 1 and with parts broken away;

FIG. 4 is a fragmentary perspective view, on an enlarged scale, of a part of the motor housing, showing a brush holder and brush retainer structure, with the latter in open position;

FIG. 5 is an exploded view of the brush holder shown in FIG. 4 and a clamp strip which holds the brush holder in position relative to the motor housing and commutator; and FIG. 6 is a central vertical section of the electric motor power unit on an enlarged scale and taken generally along the line 6—6 in FIG. 3.

DESCRIPTION OF THE PREFERRED EMBODIMENT

The electric motor power unit is indicated generally at 10 and is shown generally in FIGS. 1 to 3 and in section in FIG. 6.

A motor casing includes a generally cylindrical outer casing part 11 having an end wall 12. An inner casing part 15 has a peripheral flange 16 and an upwardly open cylindrical section 17 having a downwardly open bearing mount 18 affixed thereto. The inner casing part 15 mounts a stator 20 of an electric motor by means of a plurality of bolts 21 and the stator coacts with a rotor 22 on a drive shaft 23 extending lengthwise of the casing. The end wall 12 of the outer casing part 11 mounts a lower bearing 25 for the drive shaft 23, with an upper bearing 26 being mounted within the bearing mount 18. A commutator 27 on the drive shaft coacts with a pair of brushes 28 and 29.

The casing additionally includes an end cap 30 which is secured to the remainder of the casing by a series of threaded members 31 which thread into a plurality of nuts 32. The end cap 30 has a top opening 35 through which a switch operating element 36 may extend and also has an internal, downwardly-depending flange 37 to engage against the top surface of the operating switch 39 and hold the switch securely in position on top of the bearing mount 18. The switch is aligned by recesses on the underside thereof receiving projections 40 and 41 on the top of the bearing mount 18. The switch is placed in circuit with the motor by a series of leads 42 which are shown disconnected from the switch in FIG. 2.

The end cap 30 is formed with a pair of spaced vertical annular walls 45 and 46 and with the annular wall 46 being spaced from a generally rectangular top part of the end cap having side walls 47 and 48. The annular walls 45 and 46 are spaced from each other for a substantial part of their peripheral extent with openings 49 and 50 therebetween to provide air passages for flow of air to the motor. Additionally, the annular wall 46 is spaced from the side walls 47 and 48 and with openings 51 and 52 therebetween to provide additional air passages. The air for cooling of the motor is drawn through the aforesaid openings by means of a fan 55 fastened to the lower end of the drive shaft 23, with air leaving the motor casing through a series of openings 56 in the end wall 12 of the outer casing part 11.

An end 60 of the motor shaft 23 extends outwardly for connection to a flexible shaft which extends to a tool, such as a concrete vibrator as shown in U.S. Pat. Nos. 3,042,386 and 3,180,625 and wherein rotation of an element within the concrete vibrator results in vibration of the tool.

The brushes 28 and 29 are each carried in a brush holder with the identical brush holders indicated generally at 61 and 62. The brush holder 62 is shown particularly in FIGS. 4 to 6. The brush holder 62 includes a hollow body 63 fitted within a notch 64 in the cylindrical section 17 and having top and bottom walls and side walls defining a chamber for a brush. The top wall 65 has an alignment and retention notch 66 which coacts with a planar clamp strip 67 fittable into the notch as shown in FIG. 4. The clamp strip 67 is secured to the cylindrical section 17 by a pair of fasteners 68 and 69 threadable into openings 70 and 71 in the cylindrical section 17. An electrical lead 42 is in electrically conducting relation with the clamp strip 67 and held by the fastener 68. With the parts assembled as shown in FIG. 4, the brush holder is held in proper position with respect to the commutator 27 of the motor. A brush retainer 75 is pivotally mounted for movement between brush-retaining position, shown in FIG. 2, and a brush-replacement position, shown in FIG. 4, by pivotal mounting to the clamp strip fastener 69. When a brush is to be replaced, the fastener 69 is loosened whereby the brush retainer 75 may be pivoted to the position shown in FIG. 4 and to move a downturned end part 76 of the brush retainer out of alignment with the chamber of the brush holder. This permits removal and insertion of a brush 29. When the brush has been replaced, the brush retainer 75 is pivoted to the position shown in FIG. 2 and the fastener 69 is tightened to maintain this relation.

The brush retainers 75 are enclosed within the end cap 30 and, thus, not exposed to concrete. Removal and replacement of brushes is easily accomplished by removal of the end cap 30 and movement of the brush retainers 75 followed by a reversal of these steps to again place the unit in condition for operation.

The handle structure for the electric motor power unit includes a handle support 80 extending around the casing intermediate the ends thereof and held in secure relation to the casing by clamping between parts thereof. As shown particularly in FIG. 6, the handle support 80 fits between a peripheral flange 81 on the outer casing part 11 and the flange 16 of the inner casing part 15. The casing parts 11 and 15 are held in assembled relation with the handle support 80 captured therebetween by a series of bolts 82 extending upwardly from outwardly protruding parts of the flange 81 and through the handle support 80 and the flange 16. The bolts 82 thread into the casing part 11. The nuts 32 are integral with the bolts 82 to hold the casing parts in assembled relation and, additionally, receive the fasteners 31 for holding the end cap 30 to the casing.

The handle support 80 is formed of resilient electrically non-conducting material, such as a rubber-type compound and has four parts 85, 86, 87 and 88 extending outwardly therefrom and with an opening formed through each part to receive individually one of a series of elongate frame members 90, 91, 92 and 93 of tubular material which extend beyond the opposite ends of the casing. The frame members 90–93 are inwardly curved at an end 95 and protect the lower end of the casing. The opposite ends of the frame members 90–93 mount a quadrilateral handle H having sides 96, 97, 98 and 99 of equal length. Each of the four corners of the handle has a depending cylindrical part 100 with a recess to receive an end of one of the frame members 90–93.

The frame members 90–93 are each secured to the handle support 80 by a rivet 110 extending through a bushing 111 and through an opening in the wall of the frame member. Similar rivet fasteners 112 secure the upper ends of the frame members 90–93 within the cylindrical part 100 at each of the corners of the handle H.

With the structure disclosed herein, an operator may easily pick up the electric motor power unit by having each side of the handle of a length adequate to permit gripping by the hand of an operator and with the motor operating switch having its element 36 positioned for simple engagement by the thumb or finger of an operator while the unit is being held. The resilient handle support 80 isolates the handle from vibrations and also electrically insulates the handle. The handle H may be formed of a relatively rigid material, such as vulcanized rubber, or may have a metallic core imbedded within a relatively resilient covering material.

When it is necessary to replace the brushes 28 and 29, the end cap 30 is removed for access to the brush holders. The end cap has prevented cement coming into contact with the brushes and the retaining structure therefor, whereby the brush retaining structure may be easily moved to a position to permit replacement of brushes. The fastener which pivotally mounts the brush retainer need only be loosened to permit pivoting of the brush retainer and, after brush replacement, the brush retainer is held in retaining position by tightening of the fastener.

Additional electrical insulation of the electric motor power unit is provided by the mounting of the power cord 115 having a pair of leads 116 connectable to the switch 39. The bearing mount 18, which is formed of electrically-insulating material, has a radially-extending and downwardly-inclined arm 120, with a concave upper surface 121 to curvingly receive a part of the power cord 115 adjacent the leads 116. A cord clamp bracket 125 spans the radial arm 120 of the bearing mount and has a convex lower surface to engage against the curved part of the power cord fitted in the concave recess 121. A U-shaped fastening member 126 with threaded ends 127 extends beneath the radial arm 120 and through openings in the bracket 125 whereby a pair of nuts applied to the threaded ends of the fastening member may draw the bracket 125 down against the curved section of the power cord. This tightly secures the power cord to the insulating bearing mount carrying the switch and, further, provides for secure attachment of power cords of differing diameters.

Additionally, the power cord 115 has an annular grommet 130 secured thereto with a peripheral groove which receives a rib 131 on the cylindrical section 17 and a rib 132 on the end cap 30 whereby the grommet is completely captured, as shown in FIG. 1, when the parts are assembled.

I claim:

1. An electric motor power unit for driving a concrete vibrator comprising, a casing housing the motor, a handle support of resilient material encircling and secured to said casing and having pats thereof at a distance from the casing, a handle of a quadrilateral shape at a distance from the casing and having a plurality of sides defining four corners therebetween which corners are in alignment with the parts of the handle support, each of said handle sides being of a length to permit engagement thereof by the hand of an operator, a plurality of elongate frame members fitted into said parts and the handle at said corners to define a protective enclosure for the unit and with said handle support provide a mounting for said handle.

2. An electric motor power unit as defined in claim 1 wherein said casing is formed of plural parts and said handle support is held in position by fitting between parts of said casing.

3. An electric motor power unit as defined in claim 1 wherein an operating switch for the motor extends from an end of the casing adjacent said handle for manual operation by a hand engaging said handle.

4. An electric motor power unit as defined in claim 3 wherein the casing has an end cap, said end cap engaging and holding said operating switch in assembled position, and a plurality of passages in said end cap for passage of air to said motor.

5. An electric motor power unit as defined in claim 1 wherein the casing has an end cap, means removably attaching said end cap to the casing, and a plurality of brush holders for the motor enclosed by the end.

6. An electric motor power unit as defined in claim 5 wherein each of said brush holders includes a brush retainer pivotally mounted to the brush holder and movable to and from a position closing off a brush holding chamber in the brush holder.

7. An electric motor power unit having a casing enclosing a motor, a motor housing, a pair of brush holders positioned in slots in the motor housing and each having a top wall with an alignment notch therein, means holding the brush holders in assembled relation with the motor housing including a pair of planar clamp strips engageable one in each of said notches, and a pair of fasteners securing each of said clamp strips to the motor housing, and a brush retainer pivotally mounted to one of said fasteners for movement between a brush holding position across an end of the brush holder and a second position permitting removal of a brush.

8. An electric motor power unit as defined in claim 7 wherein the fastener to which the brush retainer is pivoted is a member threaded to the motor housing for adjustment to either tightly hold the brush retainer in brush holding position or to permit pivoting thereof.

9. An electric motor power unit for driving a tool comprising, a two-part casing housing a motor, an annular handle support member of resilient electrically non-conducting material captured between the parts of the casing and having four parts projecting a distance from the casing and with an opening through each part, a plurality of elongate tubular frame members extending one through each of said openings to locations beyond the opposite ends of the casing, and a quadrilateral handle having four corners with a recess at each corner to receive an elongate frame member, and means for securing said frame members to said handle support member and to the handle, said handle having a plurality of sides each of a length to permit engagement by a hand of an operator.

10. An electric motor power unit as defined in claim 9 including a motor, switch means for operating the motor, a power cord extending into the casing and connected to the switch, and means for securing the power cord to the casing including a member having a concave recess to curvingly receive a portion of the power cord, a bracket engageable against the power cord, means for tightening the bracket against the power cord to firmly urge the power cord into said concave recess, and an annular grommet secured to said power cord with a peripheral groove therein and with ribs on a part of the casing and an end cap for the casing to engage in said peripheral groove and securely lock the grommet to the casing.

* * * * *